Feb. 1, 1955 E. SCALF 2,700,890
OIL LEAKAGE DETECTOR
Filed July 27, 1951
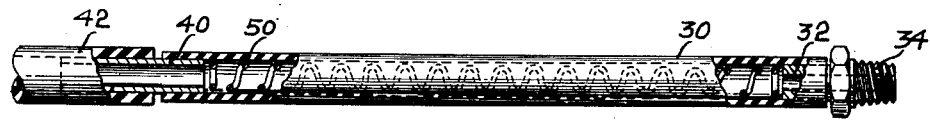
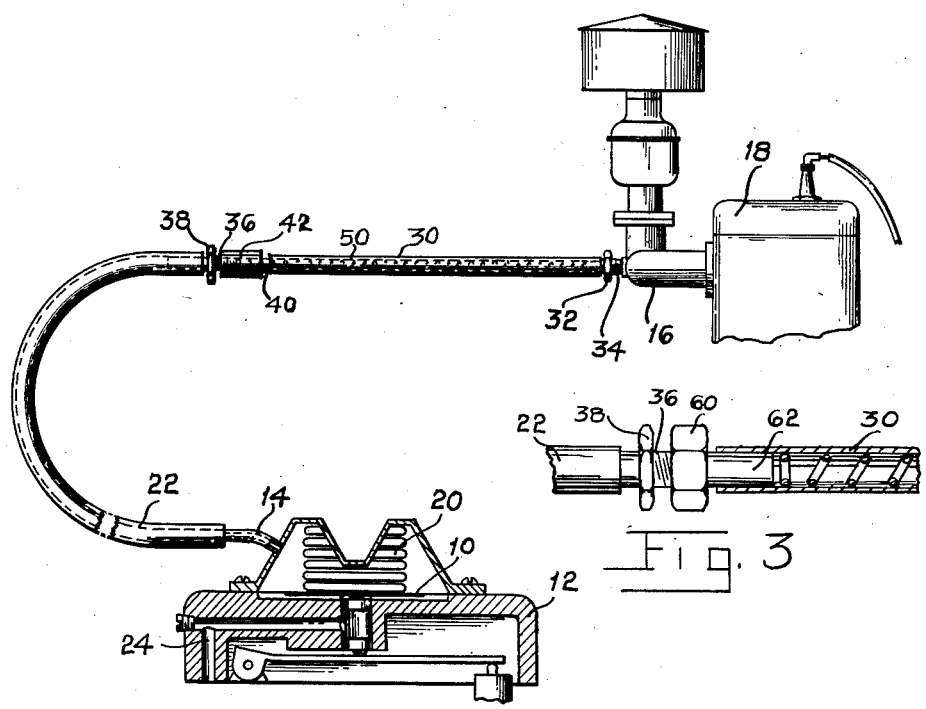
INVENTOR.

United States Patent Office 2,700,890
Patented Feb. 1, 1955

2,700,890

OIL LEAKAGE DETECTOR

Ed Scalf, Dayton, Ohio

Application July 27, 1951, Serial No. 238,969

5 Claims. (Cl. 73—40)

This invention relates to an oil leakage detector and more particularly to an oil detector to detect oil in vapor or in an atomized state suspended either in a partial vacuum or in gases.

In connection with the modulator used in automatic gear shifting devices, a vacuum actuated diaphragm is used in circulating fluids or maintaining the fluids under pressure, as the case may be. In the event a leak develops in the diaphragm, whatever the cause may be, oil escapes through this leak into the vacuum created by the engine, resulting in a loss of oil and in the improper operation of the engine, oftentimes causing the engine to smoke, the spark plugs to become fouled and other ill effects. The oil escaping into the manifold of the engine may consist of finely divided particles that are difficult to detect. For example, attempts have been made to insert a glass or a transparent tube into the vacuum pipe line to see the oil escape. However, due to the high velocity of the particles of oil and the smallness thereof, the particles of oil are invisible.

An object of this invention is to provide a device for detecting oil leaking from the diaphragm and escaping into the manifold of an engine.

Another object of this invention is to provide a transparent flexible tubular member that is reinforced so as to prevent collapse of the tubular member when used in a vacuum system and at the same time the reinforcing member functioning as an oil detector.

Other objects and advantages reside in the construction of parts, the combination thereof and the mode of operation, as will become more apparent from the following description.

Referring to the drawings,

Figure 1 is a cross sectional view of a modulator having a vacuum operated diaphragm shown in association with the manifold of the engine of an automobile, the modulator shown in section being drawn to a greatly enlarged scale, for the purpose of clearness.

Figure 2 is a side elevational view of the oil detector showing parts in section.

Figure 3 is a fragmentary side elevational view of a modification, shown partly in section.

In the drawings, the reference character 10 indicates a diaphragm of a modulator 12 that is actuated by pulsations in the vacuum feed line or conduit 14 normally connected to the manifold 16 of an internal combustion engine 18. A spring 20 actuates the diaphragm 10 in one direction, the vacuum supplied through the conduit 14 actuates the diaphragm in the opposite direction. In the event of a break in the diaphragm 10 or in the event of a failure in sealing the diaphragm, oil from the conduit 24 will be drawn through the crack in the diaphragm or through the leaky seal and drawn through the conduit 22 into the manifold 16. This results in improper operation of the automobile, loss of oil from the conduit 24, fouling of the spark plugs, charring of the valves and an accumulation of carbon in the engine. Furthermore, oil drawn in through the engine in this manner oftentimes results in the discharge of smoke through the exhaust. It is difficult to detect when oil is lost in this manner. Usually, no oil can be detected by disconnecting the conduit 22 from the manifold 16.

An oil detector has been devised for detecting the leakage of oil. This oil detector includes a transparent, thin, tubular member 30 having one end connected to a nipple 32 provided with threads 34 adapted to threadedly engage the aperture in the manifold normally receiving the threads 36 of the nipple 38 used in connecting the conduit 22 directly to the manifold. This flexible, transparent, tubular member 30 has its opposite end press-fitted upon a short metallic tube 40 supporting a piece of hose 42 adapted to engage the threads 36 of the nipple 38.

The transparent, flexible, tubular member has mounted therein a duo-functional helical member 50, simulating a coil spring. This member 50, which may be made from wire, functions to prevent the transparent, thin, tubular member 30 from collapsing. In addition thereto, this helical member functions as an obstruction in the path of gases and atomized oil that may be leaking through the diaphragm 10. Due to the vacuum, the particles of oil flowing through the conduit 22 travel at a very high rate of speed, so as to become practically invisible. However, upon the oil particles impinging upon the convolutions of member 50, drops of oil will form on this member that are visible through the transparent tubular member. That being the case, the helical member 50 is duo-functional, in that it prevents the collapse of the tubular member and at the same time functions as a condenser upon which the oil accumulates.

This oil detector is placed between the manifold and the nipple 36 by merely removing the nipple 36 from the manifold and inserting the oil detector between the manifold and the nipple. Then, upon operating the engine, it can readily be detected whether or not oil is leaking through or around the diaphragm 10.

Although this oil detector has been described in connection with the automatic gear shift control of automobiles, this oil detector may be used in any other position where oil may leak, especially into a vacuum, irrespective of the use of the diaphragm used in propelling the fluid.

Furthermore, this device is not necessarily limited to the use of detecting oil, in that it may be used in detecting other liquids suspended in a gaseous or partial vacuum conduit.

In the modification disclosed in Figure 3, instead of the hose 42 as shown in the preferred embodiment, a coupling unit 60, having a cylindrical end 62 projecting into the transparent tubular member 30, is used for connecting the threaded member 36 to the tubular member 30.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A liquid detector for use in detecting leaks in the diaphragm of a modulator wherein the diaphragm is actuated in one direction by a spring and in the opposite direction by the vacuum in the manifold of an internal combustion engine, the diaphragm being connected to the manifold by a conduit, said detector including a thin transparent flexible tubular member, means for connecting the tubular member into the conduit supplying vacuum to the diaphragm, a duo-functional helical member mounted in the transparent flexible tubular member, said helical member reinforcing the tubular member so as to prevent collapse thereof and at the same time functioning as an obstruction against which a liquid flowing through the conduit is condensed so that liquids may thereby be detected.

2. A liquid detector for use in detecting leaks in the diaphragm of a modulator wherein the diaphragm is actuated by the vacuum in the manifold of an internal combustion engine, the diaphragm being connected to the manifold by a conduit, said detector including a thin transparent tubular member, a threaded coupling member attached to one end of the tubular member for threadedly engaging the manifold, means for connecting the opposite end of the tubular member to the conduit normally connecting the diaphragm to the manifold, and an obstruction member consisting of a helical spring member mounted in the tubular member against the convolutions of which the liquid particles flowing through the conduit are condensed so that liquid may thereby be visibly detected.

3. A liquid detector according to claim 2, wherein the means for connecting one end of the tubular member to the conduit includes a sleeve member fixedly attached to the tubular member, and a hose-like coupling for coupling the sleeve member to the conduit.

4. A liquid detector for use in detecting leaks in the diaphragm of a modulator wherein the diaphragm is actuated in one direction by a spring and in the opposite direction by the vacuum in the manifold of an internal combustion engine, the diaphragm being connected to the manifold by a conduit, said detector including a thin transparent tubular member, means for connecting the tubular member into the conduit supplying vacuum to the diaphragm, and an obstruction member consisting of a helical spring member located in the transparent tubular member, the liquid particles impinging upon the convolutions of the helical spring member being condensed so that the liquid may thereby be visibly detected.

5. A detector for detecting particles of liquid flowing through a closed conduit system, said detector including a thin tubular transparent member, a threaded coupling fixedly attached to one end of the transparent member for connecting said member into said closed conduit system, coupling means for connecting the other end of the transparent member to the conduit system, and an obstruction consisting of a helical spring member mounted in the transparent member, said spring member functioning as a condenser in that as the liquid particles impinge against the convolutions of the spring member they condense so as to be visibly detected.

References Cited in the file of this patent

UNITED STATES PATENTS

| | | |
|---|---|---|
| 1,262,013 | Callon | Apr. 9, 1918 |
| 1,471,088 | Ballard | Oct. 16, 1923 |
| 1,783,644 | Geyer et al. | Dec. 2, 1930 |
| 1,937,069 | Rado | Nov. 28, 1933 |
| 2,344,315 | McCawley | Mar. 14, 1944 |
| 2,362,446 | Bodine | Nov. 14, 1944 |
| 2,566,742 | ODell | Sept. 4, 1951 |